(12) United States Patent
Musha et al.

(10) Patent No.: US 11,628,565 B2
(45) Date of Patent: Apr. 18, 2023

(54) SUBSTRATE TRANSPORT DEVICE AND SUBSTRATE TRANSPORTING METHOD

(71) Applicant: ULVAC, Inc., Chigasaki (JP)

(72) Inventors: Kazuhiro Musha, Chigasaki (JP); Hirofumi Minami, Chigasaki (JP); Takayuki Suzuki, Chigasaki (JP)

(73) Assignee: ULVAC, Inc., Chigasaki (JP)

( * ) Notice: Subject to any disclaimer, the term of this patent is extended or adjusted under 35 U.S.C. 154(b) by 206 days.

(21) Appl. No.: 17/036,365

(22) Filed: Sep. 29, 2020

(65) Prior Publication Data

US 2021/0101281 A1   Apr. 8, 2021

(30) Foreign Application Priority Data

Oct. 2, 2019   (JP) .............................. JP2019-182143

(51) Int. Cl.
*B25J 9/16*   (2006.01)
*B25J 15/00*   (2006.01)
*B25J 13/08*   (2006.01)

(52) U.S. Cl.
CPC ............. *B25J 9/1651* (2013.01); *B25J 9/163* (2013.01); *B25J 13/088* (2013.01); *B25J 15/0014* (2013.01)

(58) Field of Classification Search
CPC ........ B25J 9/1651; B25J 9/163; B25J 13/088; B25J 15/0014; B25J 9/1638; B25J 18/04; B25J 11/0095; B25J 9/16; B25J 9/1694; H01L 21/68707; H01L 21/67742; H01L 21/67259
See application file for complete search history.

(56) References Cited

U.S. PATENT DOCUMENTS

| 6,456,480 | B1 * | 9/2002 | Hirose | H01L 21/67017 361/213 |
| 2001/0047225 | A1 | 11/2001 | Shimoike et al. | |
| 2011/0150607 | A1 * | 6/2011 | Hong | H01L 21/67742 414/222.01 |
| 2014/0156070 | A1 * | 6/2014 | Merry | B25J 9/1653 700/253 |

(Continued)

FOREIGN PATENT DOCUMENTS

| JP | 2000223549 A | 8/2000 |
| JP | 2014165439 A | 9/2014 |

(Continued)

OTHER PUBLICATIONS

English Abstract for JP2014165439A (2014).

(Continued)

*Primary Examiner* — Nicholas Kiswanto
*Assistant Examiner* — Danielle Marie Jackson
(74) *Attorney, Agent, or Firm* — Caesar Rivise, PC

(57) ABSTRACT

A substrate transport device includes an arm, an end effector coupled to the arm, a driver configured to lift the arm so that the end effector receives a substrate, and a controller configured to control an output of the driver to change a lifting speed of the arm. While lifting the arm at a first speed to lift the end effector toward the substrate, the controller changes the lifting speed to a second speed that is lower than the first speed when the end effector starts to raise a height position of the substrate.

6 Claims, 4 Drawing Sheets

(56) References Cited

U.S. PATENT DOCUMENTS

| | | | |
|---|---|---|---|
| 2014/0241836 A1 | 8/2014 | Kondoh | |
| 2015/0179491 A1 | 6/2015 | Katsuda et al. | |
| 2017/0357162 A1* | 12/2017 | Zhou | G03F 7/70758 |
| 2018/0122656 A1* | 5/2018 | Murakami | B65G 1/0464 |
| 2018/0281185 A1* | 10/2018 | Toshimitsu | B25J 15/02 |

FOREIGN PATENT DOCUMENTS

| | | |
|---|---|---|
| JP | 2015032617 A | 2/2015 |
| JP | 2015-119070 A | 6/2015 |

OTHER PUBLICATIONS

English Abstract for JP2000223549A (2000).
English Abstract for JP2015032617A (2015).
Office Action dated Nov. 2, 2021 in corresponding Japanese Patent Application No. 2019-182143.

* cited by examiner

Fig.4
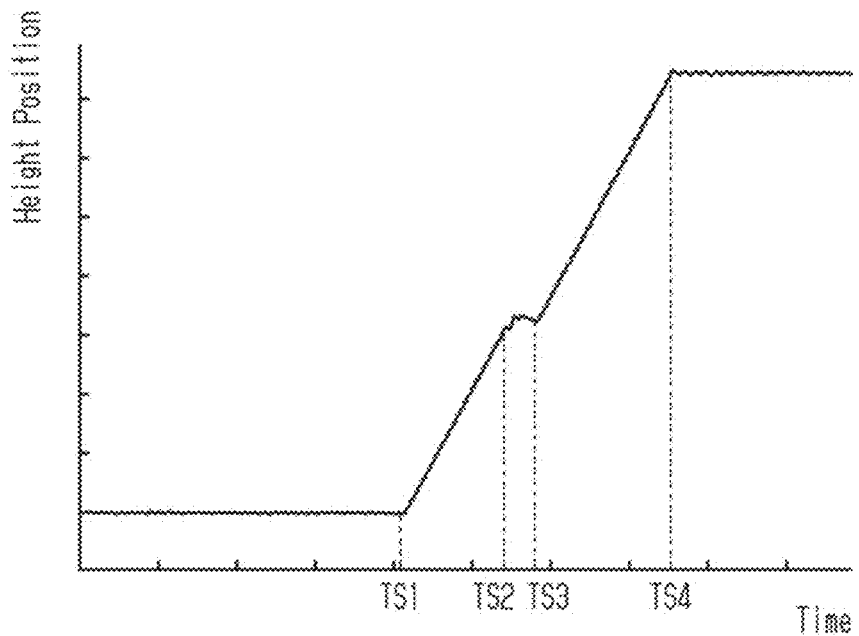
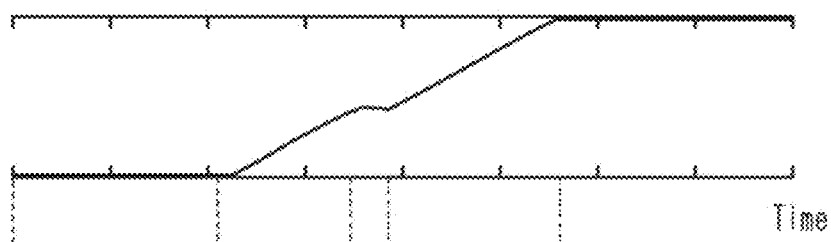
Fig.5A
Fig.5B
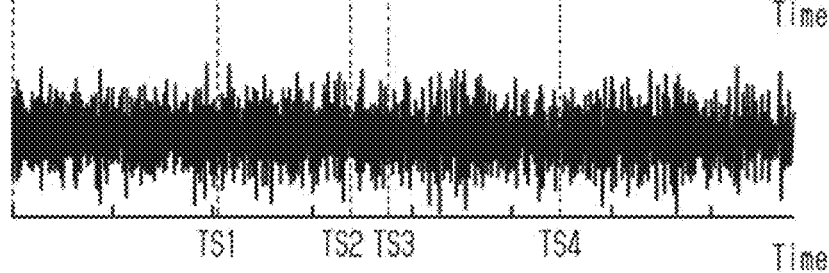
Fig.5C

SUBSTRATE TRANSPORT DEVICE AND SUBSTRATE TRANSPORTING METHOD

BACKGROUND

1. Field

The following description relates to a substrate transport device and a substrate transporting method.

2. Description of Related Art

An apparatus that manufactures various devices such as semiconductor elements or light emitting elements includes a substrate transport device that transports a substrate used to form the elements. The substrate transport device includes an end effector supported by an arm. The end effector lifts together with the arm and receives a substrate from a mount table or the like on which the substrate is mounted. The end effector lowers together with the arm and delivers the substrate, which is mounted on the end effector, to the mount table. The substrate transport device includes a detector that optically detects a mount state of the substrate. A controller configured to control the driving of the arm executes subsequent processes based on detection results of the detector (refer to Japanese Laid-Open Patent Publication No. 2015-119070).

SUMMARY

An increase in the moving speed of the end effector is favorable in a viewpoint of reducing the time taken for the transportation. On the other hand, a decrease in the moving speed of the end effector is favorable in a viewpoint of increasing the position accuracy of the substrate at the transport destination and a viewpoint of limiting generation of particles as a result of reduction in residual oscillation of the substrate. As described above, the transport efficiency of the substrate and the position accuracy of the substrate have a tradeoff relationship in which when an increase in one of the two decreases the other. In a substrate transport device that needs both reduction in the transportation time and improvement of the position accuracy, there is a need to increase the degree of design freedom so that the conflicting correlation between them diminishes.

It is an objective of the present disclosure to provide a substrate transport device and a substrate transporting method that increase the degree of design freedom.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment of a substrate transport device includes an arm, an end effector coupled to the arm, a driver configured to lift the arm so that the end effector receives a substrate, and a controller configured to control an output of the driver to change a lifting speed of the arm. While lifting the arm at a first speed to lift the end effector toward the substrate, the controller changes the lifting speed to a second speed that is lower than the first speed when the end effector starts to raise a height position of the substrate.

An embodiment of a substrate transporting method includes lifting an end effector toward a substrate by lifting an arm coupled to the end effector at a first speed, and changing a lifting speed of the arm to a second speed that is lower than the first speed when the end effector starts to raise a height position of the substrate.

When the end effector that is lifting contacts the substrate, the weight of the substrate affects the end effector, so that the end effector and the arm are bent in accordance with the rigidity of the end effector and the rigidity of the arm. After the bending of the end effector and the arm starts to stabilize, the height position of the substrate starts to rise. That is, reception of the substrate starts. In this regard, each configuration described above decelerates the end effector when the end effector starts to raise the height position of the substrate. Until the reception of the substrate starts, the lifting speed of the end effector is increased so that the time taken for the transportation is reduced. When the reception of the substrate starts, the lifting speed of the end effector is decreased so that the position accuracy of the substrate is increased. As a result, the degree of design freedom is increased to diminish the conflicting correlation between reduction in the transportation time and improvement of the position accuracy.

In the above substrate transport device, when an oscillation changes at the end effector after the lifting speed is changed to the second speed, the controller may increase the lifting speed from the second speed.

In the above substrate transporting method may further includes increasing the lifting speed from the second speed when an oscillation changes at the end effector after the lifting speed is changed to the second speed.

The lifting of the end effector by the arm oscillates the end effector slightly in the vertical direction. When the substrate becomes static relative to the end effector that is oscillating, the oscillation changes from an oscillation in which only the end effector acts as an oscillator to an oscillation in which the end effector and the substrate act as oscillators. In this regard, each configuration described above accelerates the end effector when the oscillation changes at the end effector. Thus, until the reception of the substrate is completed, the lifting speed of the end effector is reduced so that the position accuracy of the substrate is increased. When the reception of the substrate is completed, the lifting speed of the end effector is increased so that the time taken for the transportation is reduced. As a result, the degree of design freedom is increased to further diminish the conflicting correlation between reduction in the transportation time and improvement of the position accuracy. In addition, the transporting method produces an accompanying effect that reduces the oscillation in which the end effector and the substrate act as oscillators. This limits generation of particles caused by residual oscillations.

The substrate transport device described above may include a position detector configured to detect the height position of the substrate. When a detection result of the position detector is changed while lifting the end effector toward the substrate, the controller may determine that the end effector has started to raise the height position of the substrate.

The substrate transporting method described above may further include executing a first teaching process that teaches that a first target position is a position of the arm at which the end effector starts to raise the height position of the substrate. In the first teaching process, a position detector may be used to detect the height position of the substrate. The first teaching process may include teaching that the first target position is a position of the arm at which a detection result of the position detector changes while lifting the end effector toward the substrate. The changing the lifting speed of the arm to the second speed may include changing the lifting speed of the arm from the first speed to the second speed when the arm reaches the first target position.

Each configuration described above decelerates the end effector based on the detection result of the position detector. This further increase the effectiveness of changing the lifting speed to the second speed to improve the position accuracy.

The substrate transport device described above may include an oscillation detector configured to detect an oscillation of the end effector. When a detection result of the oscillation detector is changed after the lifting speed is changed to the second speed, the controller may determine that the oscillation is changed at the end effector.

The substrate transporting method described above may further include executing a second teaching process that teaches that a second target position is a position of the arm at which the lifting speed increases from the second speed. In the second teaching process, an oscillation detector may be used to detect an oscillation of the end effector. The second teaching process may include teaching that the second target position is a position of the arm at which a detection result of the oscillation detector changes after the lifting speed is changed to the second speed. The increasing the lifting speed from the second speed may include increasing the lifting speed from the second speed when the arm reaches the second target position.

Each configuration described above accelerates the end effector based on the detection result of the oscillation detector. This further increases the effectiveness of changing the lifting speed from the second speed to improve the transportation efficiency.

Other features and aspects will be apparent from the following detailed description, the drawings, and the claims.

BRIEF DESCRIPTION OF THE DRAWINGS

FIG. 4 is a graph illustrating details of changes in the height position of an end effector during the teaching process.

FIG. 5A is a graph illustrating changes in lift position in the teaching process.

FIG. 5B is a graph illustrating changes in speed in the teaching process.

FIG. 5C is a graph illustrating changes in acceleration rate during the teaching process.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A substrate transport device and a substrate transporting method will now be described with reference to FIGS. 1 to 7.

Figure 1:
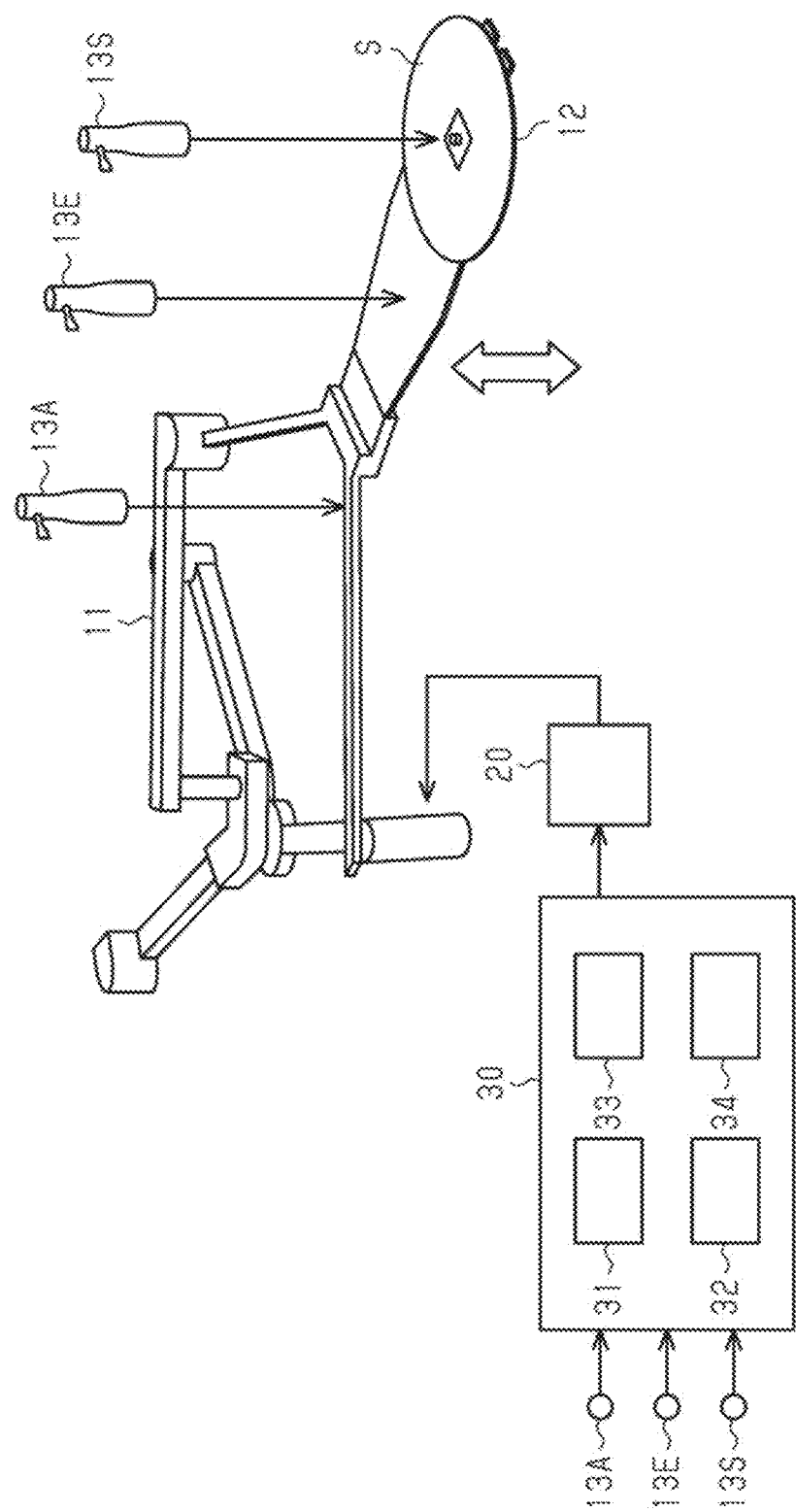
FIG. 1 is a diagram illustrating a device configuration of an embodiment of a substrate transport device.

As illustrated in FIG. 1, a substrate transport device includes an arm 11, an end effector 12, a substrate sensor 13S, an effector sensor 13E, an arm sensor 13A, a driver 20, and a control device 30.

The arm 11 is mounted on and supported by a main body so that the arm 11 is configured to lift and lower relative to the main body and to rotate and extend and contract in a horizontal direction. The end effector 12 is configured so that a substrate S, or a transport subject, is mounted on the end effector 12. The substrate S is mounted on a mount such as a stage or a front opening unified pod (FOUP). The substrate transport device lowers the arm 11 to deliver the substrate S from the end effector 12 to the mount. The substrate transport device lifts the arm 11 so that the end effector 12 receives the substrate S from the mount.

The substrate sensor 13S optically detects the height position of the substrate S mounted on the end effector 12. The substrate sensor 13S inputs the detected height position of the substrate S to the control device 30. The effector sensor 13E optically detects the height position of the end effector 12. The effector sensor 13E inputs the detected height position of the end effector 12 to the control device 30. The arm sensor 13A optically detects the height position of the arm 11. The arm sensor 13A inputs the detected height position of the arm 11 to the control device 30.

The control device 30 controls outputs of the driver 20 to control the lifting and lowering, the rotation, and the extension and contraction of the arm 11. The control device 30 controls movement of the arm 11 based on teaching data stored in advance. The driver 20 lifts and lowers, rotates, and extends and contracts the arm 11 so that the end effector 12 receives the substrate S from the mount or the substrate S is delivered from the end effector 12 to the mount in accordance with instructions of the control device 30.

The control device 30 includes a controller 31, storage 32, a transporting processor 33, and a teaching processor 34. The controller 31 includes, for example, software and hardware elements that are used in a computer such as CPU, RAM, and ROM. The controller 31 is not limited to one that processes all of the various processes using the software. The controller 31 may include, for example, an application specific integrated circuit (ASIC) that is dedicated hardware that executes at least some of the various processes. The controller 31 may include circuitry that includes one or more dedicated hardware circuits such as ASICs, one or more microcomputers that are processors operating in accordance with software, that is, computer programs, or a combination of these.

The storage 32 stores a transportation program and various types of data including the teaching data. The controller 31 reads the transportation program and the data stored in the storage 32 and executes the transportation program so that the transporting processor 33 and the teaching processor 34 execute various processes such as a transportation process and a teaching process.

The transporting processor 33 generates a drive signal that causes the arm 11 to lift or lower, rotate, and extend or contract based on the teaching data and outputs the generated drive signal to the driver 20. Teaching data used in the lifting and lowering associates the height position of the arm 11 with the lifting speed of the arm 11.

Figure 2:
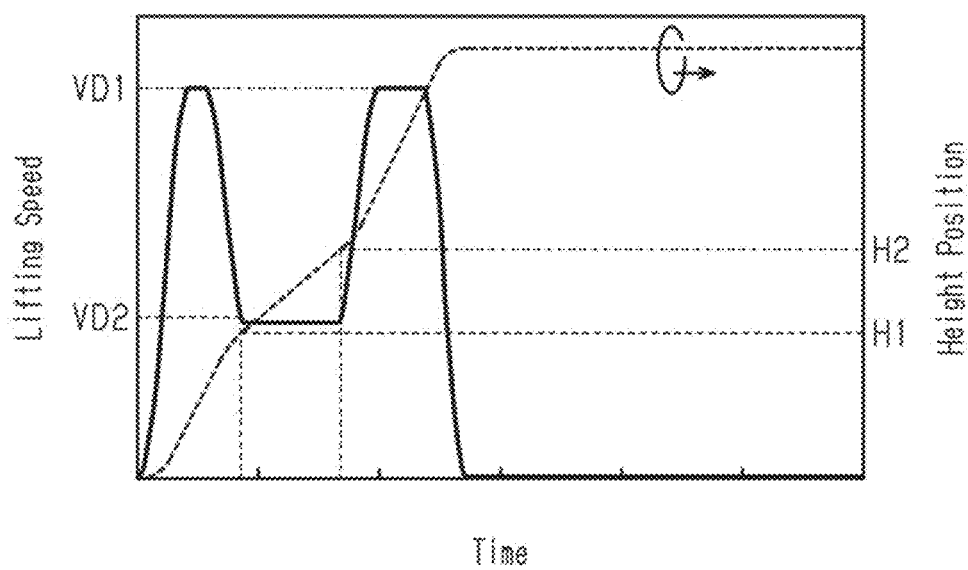
FIG. 2 is a graph illustrating changes in lifting speed and height position.

As illustrated in FIG. 2, the teaching data includes data used to increase the lifting speed to a first speed VD1 at a predetermined acceleration rate from when the height position of the arm 11 is a reference position prior to the lifting. The teaching data also includes data used to decrease the lifting speed to a second speed VD2 when the height position of the arm 11 reaches a first target position H1. The teaching data also includes data used to increase the lifting speed from the second speed VD2 toward the first speed VD1 when the height position of the arm 11 reaches a second target position H2.

The first target position H1 is a height position of the arm 11 at which the end effector 12 starts to raise the height position of the substrate S. The second target position H2 is a height position of the arm 11 at which an oscillation changes at the end effector 12, and is higher than the first target position H1.

The transporting processor 33 decreases the lifting speed of the arm 11 from the first speed VD1 to the second speed VD2 when the arm 11 reaches the first target position H1 based on the teaching data. More specifically, while lifting the arm 11 at the first speed VD1 to lift the end effector 12 toward the substrate S, the transporting processor 33 changes the lifting speed to the second speed VD2, which is lower than the first speed VD1, when the end effector 12 starts to raise the height position of the substrate S.

The transporting processor 33 increases the lifting speed from the second speed VD2 to the first speed VD1 when the arm 11 reaches the second target position H2 based on the teaching data. More specifically, after the lifting speed is changed to the second speed VD2, when the oscillation changes at the end effector 12, the transporting processor 33 increases the lifting speed from the second speed VD2 to the first speed VD1.

The teaching processor 34 executes a first teaching process and a second teaching process. The first teaching process teaches that the first target position H1 is a position of the arm 11 at which the lifting speed of the arm 11 is decreased from the first speed VD1 to the second speed VD2. The second teaching process teaches that the second target position H2 is a position of the arm 11 at which the lifting speed of the arm 11 is increased from the second speed VD2 to the first speed VD1.

In the first teaching process, the teaching processor 34 uses the substrate sensor 13S, which detects the height position of the substrate S, and the arm sensor 13A, which detects the height position of the arm 11. In the first teaching process, the teaching processor 34 teaches that the first target position H1 is a position of the arm 11 at which the detection result of the substrate sensor 13S changes (the state of the substrate changes from being static to being lifted) while lifting the end effector 12 toward the substrate S. The substrate sensor 13S is an example of a position detector.

Figure 3:
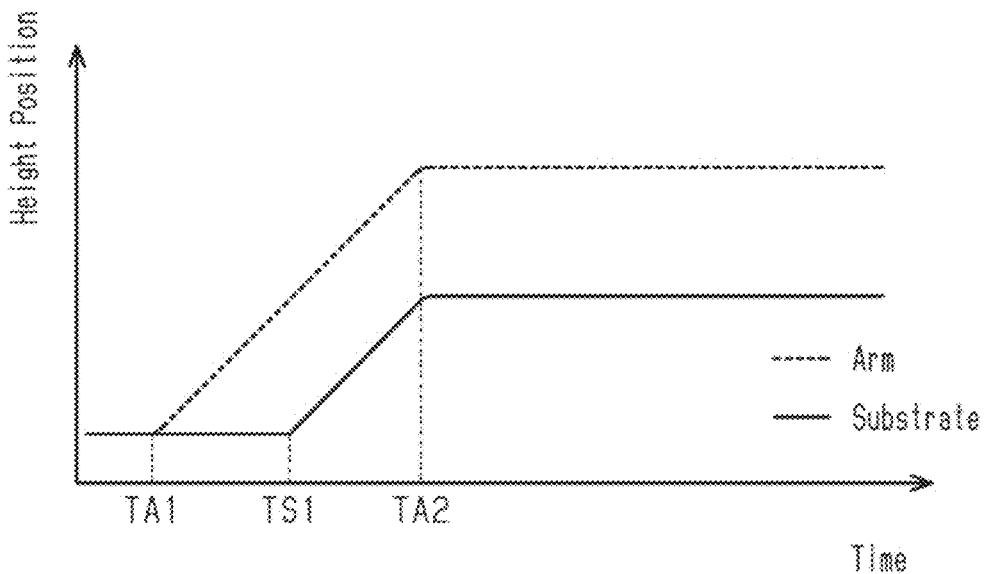
FIG. 3 is a graph illustrating changes in height positions of an arm and a substrate during a teaching process.

As illustrated in FIG. 3, in the first teaching process, when the teaching processor 34 lifts the arm 11, the arm 11 starts to lift at time TA1. The height position of the substrate S is maintained until the end effector 12 contacts the substrate S. When the teaching processor 34 continues to lift the arm 11, the detection result of the substrate sensor 13S changes at time TS1, and the substrate S starts to lift. The arm 11 and the substrate S continue to lift until time TA2 at which the teaching processor 34 stops lifting the arm 11.

In the second teaching process, the teaching processor 34 uses the effector sensor 13E, which detects the height position of the end effector 12. In the second teaching process, the teaching processor 34 causes the end effector 12 to receive the substrate S while lifting the end effector 12 toward the substrate S. At this time, the teaching processor 34 detects a change in the acceleration rate of the end effector 12 obtained from detection results of the effector sensor 13E. The teaching processor 34 teaches that the second target position H2, at which the oscillation of the end effector 12 changes, is a height position of the arm 11 at which the acceleration rate of the end effector 12 changes.

As illustrated in FIG. 4, in the second teaching process, when the teaching processor 34 lifts the arm 11 from time TS1 (no relation to symbol illustrated in FIG. 3), the lifting of the end effector 12 by the arm 11 oscillates the end effector 12 slightly in a vertical direction (causes a characteristic oscillation without the substrate S at the corresponding extension position). Then, when the end effector 12 contacts the substrate S at time TS2, the weight of the substrate S affects the end effector 12 so that the end effector 12 is bent in accordance with the rigidity of the end effector 12 and the like.

After the bending of the end effector 12 starts to stabilize, the substrate S becomes static relative to the end effector 12 at time TS3. When the substrate S becomes static relative to the end effector 12 that is oscillating, the slight oscillation of the end effector 12 changes from the oscillation in which only the end effector 12 acts as an oscillator until time TS2 to an oscillation in which the end effector 12 and the substrate S act as oscillators (changed to a characteristic oscillation with the substrate S at the corresponding extension position). The oscillation in which the end effector 12 and the substrate S act as oscillators continues until time TS4 at which the lifting of the arm 11 stops.

FIGS. 5A, 5B, and 5C respectively show changes in the height position of the end effector 12, changes in the speed of the end effector 12, and changes in the acceleration rate of the end effector 12 in the second teaching process.

As illustrated in FIG. 5B, the speed of the end effector 12 changes between before and after each of time TS1, time TS2, time TS3, and time TS4. More specifically, amplitudes of speed variations of the end effector 12 are largely affected by the oscillation in which only the end effector 12 acts as an oscillator, the oscillation in which the end effector 12 and the substrate S act as oscillators, and other factors.

As illustrated in FIG. 5C, the acceleration rate of the end effector 12 is not largely changed between before and after each of time TS1, time TS2, time TS3, and time TS4 (amplitudes are not largely changed). More specifically, the acceleration rate of the end effector 12 is affected by the oscillation in which only the end effector 12 acts as an oscillator and the oscillation in which the end effector 12 and the substrate S act as oscillators. However, it is difficult to determine the acceleration rate of the end effector 12 from only the amplitudes.

Figure 6:
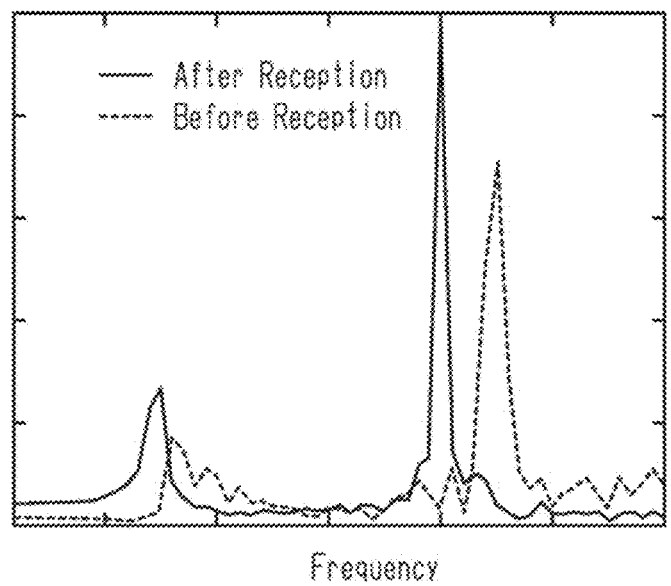
FIG. 6 is a graph illustrating a frequency analysis result of the acceleration rate before and after the reception.

FIG. 6 is an analysis result of frequency components included in the acceleration rate of the end effector 12 before and after time TS3. As illustrated in FIG. 6, the frequency components in the acceleration rate of the end effector 12 largely differ between before time TS3 and after time TS3. That is, the frequency components before the completion of the reception of the substrate S largely differ from the frequency components after the completion of the reception of the substrate S.

Figure 7:
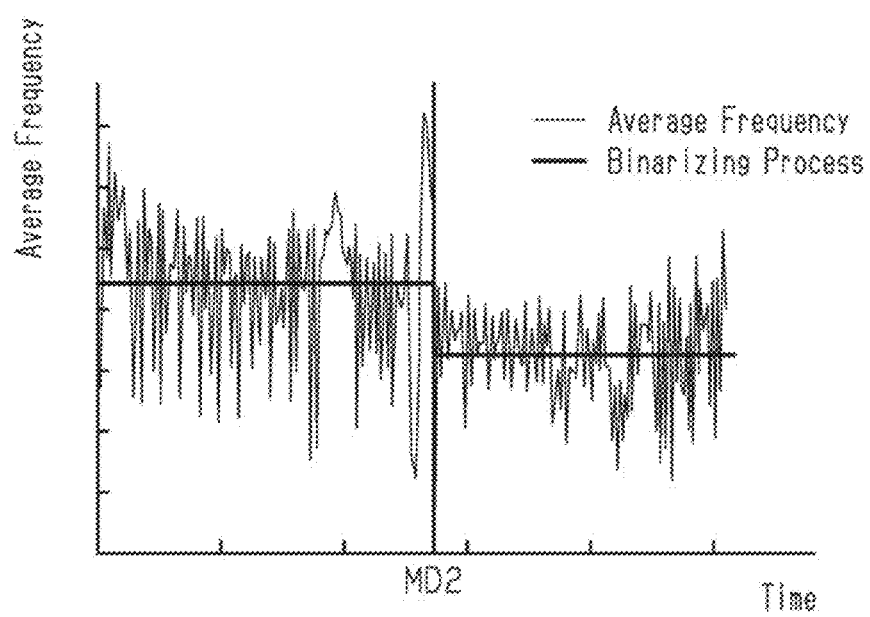
FIG. 7 is a graph illustrating changes in average frequency during the teaching process together with a result of a binarizing process.

FIG. 7 illustrates changes in average frequency included in the acceleration rate of the end effector 12 per unit time and a result of the binarizing process of the average frequency. As illustrated in FIG. 7, the frequency components are extracted from the acceleration rate of the end effector 12 to clearly specify a switching time MD2 (time TS3) that distinguishes between before the completion of the reception of the substrate S and after the completion of the reception of the substrate S. That is, the process has a high temporal resolution. In the second teaching process, the teaching processor 34 executes the binarizing process on the average frequency and teaches that the second target position H2 is a height position of the arm 11 at which the average frequency of the acceleration rate of the end effector 12 changes.

Operation

When the end effector 12 that is lifting contacts the substrate S, the weight of the substrate S affects the end effector 12, so that the end effector 12 and the arm 11 are bent in accordance with the rigidity of the end effector 12 and the rigidity of the arm 11. After the bending of the end effector 12 and the arm 11 start to stabilize, the height position of the substrate S starts to rise. At this time, the end effector 12 is decelerated to the second speed VD2, which is lower than the first speed VD1. More specifically, when the height position of the substrate S starts to rise and the reception of the substrate S starts, the lifting speed of the end effector 12 is decreased to the second speed VD2.

After the lifting speed is changed to the second speed VD2, when the oscillation changes at the end effector 12, the end effector 12 is accelerated to the first speed VD1, which is higher than the second speed VD2. The lifting of the end effector 12 by the arm 11 oscillates the end effector 12 slightly in the vertical direction. When the substrate S becomes static relative to the end effector 12 that is oscillating, the oscillation changes from an oscillation in which only the end effector 12 acts as an oscillator to an oscillation in which the end effector 12 and the substrate S act as oscillators. More specifically, when the substrate S is static relative to the end effector 12 and the reception of the substrate S is completed, the lifting speed of the end effector 12 is increased toward the first speed VD1.

The above embodiment has the advantages described below.

(1) Until the reception of the substrate S starts, the lifting speed of the end effector 12 is increased to the first speed VD1 so that the time taken for the transportation is reduced. When the reception of the substrate S starts, the lifting speed of the end effector 12 is decreased to the second speed VD2 so that the position accuracy of the substrate S is increased. As a result, the degree of design freedom is increased to diminish the conflicting correlation between reduction in the transportation time and improvement of the position accuracy. In addition, the oscillation in which the end effector 12 and the substrate S act as oscillators is reduced. This limits generation of particles caused by the oscillation.

(2) When the oscillation changes at the end effector 12, the end effector 12 is accelerated. Thus, until the reception of the substrate S is completed, the lifting speed of the end effector 12 is maintained at the second speed VD2 so that the position accuracy of the substrate S is increased. When the reception of the substrate S is completed, the lifting speed of the end effector 12 is increased to the first speed VD1 so that the time taken for the transportation is reduced. As a result, the degree of design freedom is increased to further diminish the conflicting correlation between reduction in the transportation time and improvement of the position accuracy.

(3) The first target position H1 is taught based on the detection result of the substrate sensor 13S, and the end effector 12 is decelerated in accordance with the teaching data. This further increases the effectiveness of changing the lifting speed to the second speed VD2 to improve the position accuracy.

(4) The second target position H2 is taught based on the detection result of the effector sensor 13E, and the end effector 12 is accelerated in accordance with the teaching data. This further increases the effectiveness of changing the lifting speed from the second speed VD2 to improve the transportation efficiency.

The above embodiment may be modified as follows.

One of the substrate sensor 13S and the effector sensor 13E detects the vicinity of the other. That is, the substrate sensor 13S and the effector sensor 13E may switch the functions so that one of the substrate sensor 13S and the effector sensor 13E performs the function of the other. More specifically, the first teaching process may be executed using the detection result of the effector sensor 13E, and the second teaching process may be executed using the detection result of the substrate sensor 13S. However, the configuration of the above embodiment is more favorable from the viewpoint of the detection accuracy.

More specifically, between before and after the arm 11 reaches the first target position H1, the substrate S changes from the static state to the lifting state. Therefore, the signal-to-noise (S/N) ratio is relatively high at the substrate sensor 13S. However, between before and after the arm 11 reaches the second target position H2, the state of the substrate S does not change in the same manner. The S/N ratio obtained at the substrate sensor 13S is not high as compared to that obtained at the effector sensor 13E. The change in state between before and after the arm 11 reaches the second target position H2 is a change in the characteristic oscillation value. That is, a characteristic oscillation value corresponding to components of the arm 11 and the end effector 12 is changed to a characteristic oscillation value corresponding to components of the arm 11, the end effector 12, and the substrate S. Since the substrate S is not fixed to the end effector 12, a signal detected by the substrate sensor 13S contains noise components. By contrast, a signal detected by the effector sensor 13E contains less noise components because the arm 11 is rigidly joined to the end effector 12. Thus, the position of the second target position H2 is detected with a higher accuracy.

The time at which the end effector 12 starts to raise the height position of the substrate S may refer to a time at which the inclination angle of the substrate S is changed from the seated state at a microscopic scale. More specifically, even if the substrate S and the end effector 12 are horizontally adjusted, the horizontalness of the substrate S and the end effector 12 is maintained at the microscopic scale due to the weights of the substrate S and the end effector 12. Even if the substrate S and the end effector 12 have ideal horizontal surfaces, when the substrate S is in contact with the end effector 12, the weight of the substrate S is added to the side of the end effector 12. At the microscopic scale, the substrate S and the end effector 12 do not maintain the initial positions. The end effector 12 and the arm 11 are bent and inclined in any direction based on the mechanical compliance that combines the end effector 12 and the arm 11.

In other words, when starting to raise the height position of the substrate S may be referred to as when the inclination angle of the substrate S starts to change from the initial state of the substrate S. Hence, instead of executing the first teaching process using the detection result of the substrate sensor 13S, a physical quantity that follows the inclination of the substrate S may be measured, and the first teaching process may be executed using the measurement result. Also, instead of switching from the first speed VD1 to the second speed VD2 using the detection result of the substrate sensor 13S, a physical quantity that follows the inclination of the substrate S may be measured, and the measurement result may be used to switch from the first speed VD1 to the second speed VD2.

It is assumed that the substrate S is not a rigid body and is bent by the weight of the substrate S, that is, a uniformly distributed load, in accordance with the mechanical compliance based on the physical properties of the substrate S. When the substrate S is in contact with the end effector 12, a fulcrum point is added, and the inclination angle changes in the surface of the substrate S. To detect when the substrate S starts to contact the end effector 12, since positioning errors and the like may occur, it is desirable that, as in the embodiment, information obtained from the substrate S or a portion proximate to the substrate S be used instead of robot side information.

When the oscillation changes at the end effector 12 after the lifting speed is changed to the second speed VD2, the entire weight of the substrate S is applied to the end effector 12. Hence, instead of executing the second teaching process using the detection result of the effector sensor 13E, a physical quantity such as a load that follows the application of the entire weight of the substrate S to the end effector 12 may be measured, and the second teaching process may be executed using the measurement result. Also, instead of switching from the second speed VD2 to the first speed VD1 using the detection result of the effector sensor 13E, a physical quantity such as a load that follows the application of the entire weight of the substrate S to the end effector 12 may be measured, and the measurement result may be used to switch from the second speed VD2 to the first speed VD1.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A substrate transport device, comprising:
   an arm;
   an end effector coupled to the arm;
   a driver configured to lift the arm so that the end effector receives a substrate; and
   a controller configured to control an output of the driver to change a lifting speed of the arm,
   wherein while lifting the arm at a first speed to lift the end effector toward the substrate, the controller changes the lifting speed to a second speed that is lower than the first speed upon the end effector starting to raise a height position of the substrate; and
   after the lifting speed is changed to the second speed, when a slight oscillation of the end effector caused by the lifting of the end effector changes from an oscillation in which only the end effector acts as an oscillator to an oscillation in which the end effector and the substrate act as oscillators, the controller increases the lifting speed from the second speed.

2. The substrate transport device according to claim 1, further comprising:
   a position detector configured to detect the height position of the substrate,
   wherein when a detection result of the position detector is changed while lifting the end effector, the controller determines that the end effector has started to raise the height position of the substrate.

3. The substrate transport device according to claim 1, further comprising:
   an oscillation detector configured to detect an oscillation of the end effector,
   wherein when a detection result of the oscillation detector is changed after the lifting speed is changed to the second speed, the controller determines that the oscillation is changed at the end effector.

4. A substrate transporting method, comprising:
   lifting an end effector toward a substrate by lifting an arm coupled to the end effector at a first speed;
   changing a lifting speed of the arm to a second speed that is lower than the first speed upon the end effector starting to raise a height position of the substrate, and
   after the lifting speed is changed to the second speed, when a slight oscillation of the end effector caused by the lifting of the end effector changes from an oscillation in which only the end effector acts as an oscillator to an oscillation in which the end effector and the substrate act as oscillators, increasing via a controller the lifting speed from the second speed.

5. The substrate transporting method according to claim 4, further comprising:
   executing a first teaching process that teaches that a first target position is a position of the arm at which the end effector starts to raise the height position of the substrate, wherein
   a position detector is used to detect the height position of the substrate in the first teaching process,
   the first teaching process includes teaching that the first target position is a position of the arm at which a detection result of the position detector changes while lifting the end effector, and
   the changing the lifting speed of the arm to the second speed includes changing the lifting speed of the arm from the first speed to the second speed when the arm reaches the first target position.

6. The substrate transporting method according to claim 4, further comprising:
   executing a second teaching process that teaches that a second target position is a position of the arm at which the lifting speed increases from the second speed, wherein
   an oscillation detector is used to detect an oscillation of the end effector in the second teaching process,
   the second teaching process includes teaching that the second target position is a position of the arm at which a detection result of the oscillation detector changes after the lifting speed is changed to the second speed, and the increasing the lifting speed from the second speed includes increasing the lifting speed from the second speed when the arm reaches the second target position.

* * * * *